3,299,986
VALVE OPERATING LIFTER AND VALVE TRAIN LUBRICATOR
Stephen F. Briggs, P.O. Box 1617, and Joseph F. Nemechek, 940 5th St. S., both of Naples, Fla. 33940
Filed Jan. 25, 1965, Ser. No. 427,683
8 Claims. (Cl. 184—6)

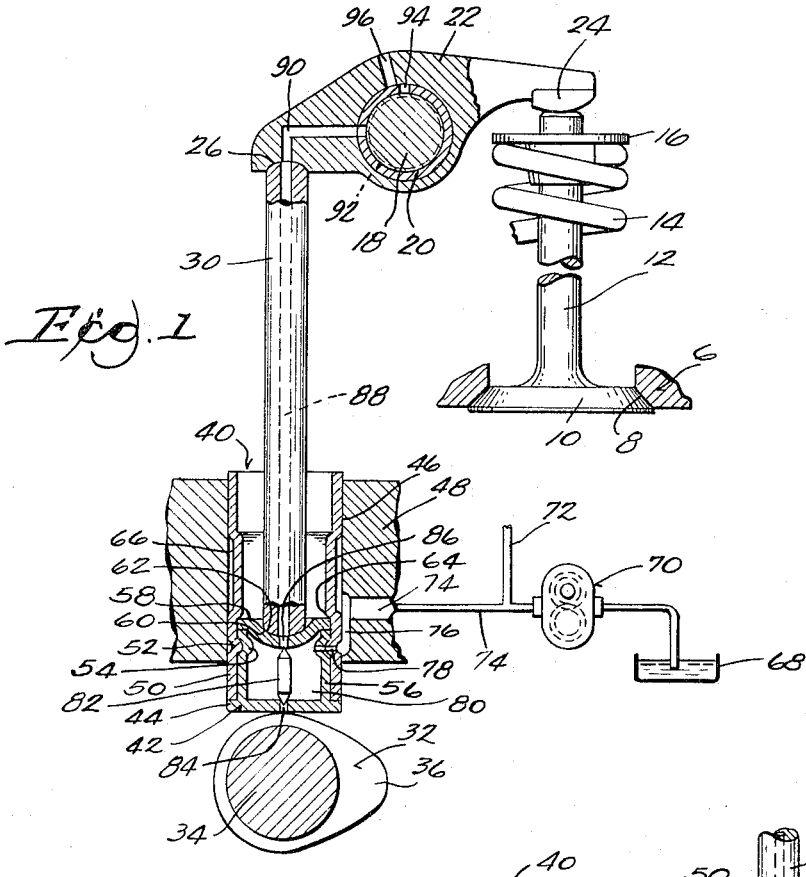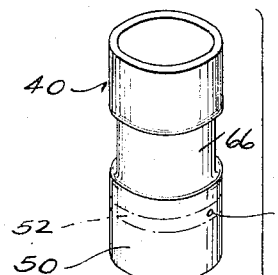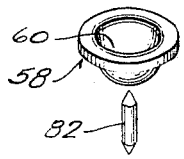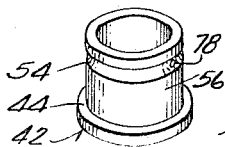
Fig. 1
Fig. 2
Fig. 3
Fig. 4
INVENTORS
STEPHEN F. BRIGGS
JOSEPH F. NEMECHEK
BY Wheeler, Wheeler + Wheeler
ATTORNEYS

United States Patent Office 3,299,986
Patented Jan. 24, 1967

This invention relates to a valve operating lifter and valve train lubricator.

A valve lifter or cam follower should be extremely light in weight, since it is normally held to the valve actuating cam solely by the bias of the valve spring which tends to seat the valve. The greater the inertia of the lifter, the greater will be the requisite spring bias. An increase in spring bias is undesirable because the lifter will have to be made of heavier and more wear-resistant material. This, in turn, will increase the inertia and require further increase in spring bias.

The present invention seeks to provide a lifter or cam follower which is extremely light in weight, thus reducing its inertia and making it possible to use a lighter valve spring and lighter materials throughout the train.

In accomplishing this result, I make the cam follower shoe in the preferred form of a cup having a marginal flange upon which a body sleeve is seated. The shoe is engaged by the cam but is the only part of the lifter subject to substantial friction. Because of the low inertia of the follower as a whole, the friction on the shoe is much less heavy than the friction to which the cam follower of a hydraulic lifter is subjected. The tubular body sleeve is subject to little or no friction. It is readily deformed to provide an integral rib engaged in a groove with which the cup-shaped shoe is provided.

The thrust between the shoe and the push rod is taken by a disk socketed to receive the lower end of the push rod and having its periphery resting directly upon the rim of the cup-shaped shoe. The disk may be welded to the rim. No pressure is transmitted through the sleeve. The disk is held on the shoe by further deformation of the tubular body sleeve. Thus the sleeve, the disk, and the shoe constitute a unitary assembly, completed without extraneous fasteners of any kind. Since the sleeve is not called upon to sustain any of the thrust between the push rod and the shoe, the sleeve can be made of extremely light material such as aluminum or an aluminum-magnesium alloy.

It is desirable to use the push rod and the follower or actuator as a means of delivering oil upwardly through the hollow push rod for the lubrication of the rocker arm and any other elevated mechanism of the valve train. This may be done either with or without valving. In the two embodiments illustrated, oil is supplied to a gallery in the bearing in which the actuator sleeve is reciprocable and this oil is delivered during at least a part of the upward stroke of the follower into the interior of the cup-shaped shoe through registering openings in the sleeve and the cup wall. Some of the oil passes through an orifice in the bottom of the cup-shaped shoe to lubricate the surface thereof on which the cam bears and to return excess lubricant to the engine crankcase sump.

Some of the oil moves upwardly through an opening in the aforesaid disk into a bore in the interior of the push rod. This opening communicates with a rocker arm duct or ducts which lead to surfaces requiring lubrication. An upward flow of oil through the push rod is effected by inertia or by an arrangement such that at one point, preferably at the point at which the valve cam is at top dead center, communication is established between the oil pump and the interior of the cup shaped shoe whereby oil pump pressure is momentarily exerted to force oil upwardly through the push rod, the escape orifice being, at this moment, at least partly closed by engagement of the valve cam therewith.

In the drawings:

FIG. 1 is a diagrammatic view largely in section but partially in side elevation showing a valve operating and lubricating system embodying the invention.

FIG. 2 is an enlarged detail view showing in perspective and in mutually separated positions the component parts of one embodiment of follower incorporating the invention.

FIG. 3 is a view partially in side elevation and partially in section through a follower of the type illustrated in FIGS. 1 and 2.

FIG. 4 is a view partially in section and partially in elevation showing a modified follower device embodying the invention, portions of the bearing support and valve cam being fragmentarily illustrated.

In the valve actuator device of FIG. 1, an engine cylinder is fragmentarily illustrated at 6. It provides at 8 a seat for a valve 10 having a stem 12 and a valve spring 14 engaged with a washer 16 on stem 12, whereby the spring bias acts on the stem in a valve seating direction.

A stationary boss or shaft 18 has a bushing at 20 upon which the rocker arm 22 may oscillate as a part of the valve gear or train. The pad 24 at the free end of the rocker arm 22 engages the outer end of the valve stem 12.

At its other end, the rocker arm 22 has a concave socket 26 with which the push rod thrust member 30 is engaged. The valve cam 32 on the cam shaft 34 causes the valve lifter or actuator or cam follower 40 to transmit motion through the push rod 30 and rocker arm 22 in a valve opening direction. In the closing movement of valve 10, the follower controls valve closing movement provided the valve spring holds the actuator or follower to the nose portion 36 of cam 32.

In both embodiments herein disclosed, the lifter 40 comprises a cup shaped shoe 42 with a marginal flange or shoulder 44, the shoe with a lower cam following surface bearing directly on the periphery of the cam 32. The shoe may be designed of wear-resisting steel or the like.

In order to guide the actuator or follower 40 for axial reciprocation, a bearing opening is provided at 46 in the engine partition 48. Bearing in the opening 46 is a lightweight guide or bearing sleeve 50 having its lower margin seated on the shoulder 44 of shoe 42. The sleeve 50 and the shoe 42 are integrally connected by means of an internal rib 52 rolled in the sleeve to force metal of the sleeve into a channel 54 in the outer periphery of the wall 56 of the cup shaped shoe 42.

Seated on the top margin of the said wall 56 is a bearing disk 58 having a concave bearing depression at 60 in which the complementary convex lower extremity 62 of the push rod 30 is seated. The portion 64 of the sleeve 50 is deformed inwardly intermediate the ends of the sleeve for the primary purpose of anchoring the disk 58 in secure engagement directly with the upper margin of the wall 56 of the shoe and also for the purpose of providing a peripheral channel at 66 into which oil is admitted for the lubrication of the bore 46 in which the sleeve portion 66 of the actuator is reciprocable.

Diagrammatically shown at 68 is the engine sump from which the oil pump 70 is constantly withdrawing oil during engine operation for the usual engine lubrication purposes. A discharge pipe 72 leads the oil to the engine bearings such as crankshaft and cam shaft bearings and connecting rod bearings. For the purposes of the present invention, a branch pressure line 74 leads from pump 70 to a gallery 76 undercut in the bearing bore 46. The vertical extent of the gallery is preferably such that it communicates during most or all of the reciprocation of the actuator or follower 40 with the external channel 66 so that such channel is provided with oil in quantities adequate for the lubrication of bore 46.

Registering ducts in the sleeve 50 and shoe wall 46 are together designated by reference character 78. The duct 78 leads into the cavity 80 in the interior of the cam follower shoe 42. In this embodiment, an inertia valve 82 is confined within cavity 80. The said valve has pointed ends alternately seating in a port 84 in the shoe 42 and a port 86 in the disk 58 with which the duct 88 of push rod 30 is in registry. At the upper end of the push rod the duct 88 communicates with a rocker-arm duct 90 which leads through the bushing 20 to the annular lubricating channel 92, whereby to lubricate the bearing of the rocker arm upon the fixed shaft or boss 18. As the rocker arm oscillates, the escape port 94 in the bushing registers with the duct 96 of the rocker arm so that excess oil flows outwardly through the rocker arm for top lubrication or return in the usual manner to the engine sump, here diagrammatically shown at 68.

As the cam nose 36 lifts the follower shoe 42 to cause the lifter to actuate the valve stem 30 in an upward port 84 whereby oil pressure is communicated upwardly through the bore 88 of the stem and through the duct 90 of the rocker arm to lubricate the rocker arm bearing and other elevated parts.

During the downward movement of the actuator or follower 40, the inertia valve 82 tends to close the port 86 and to open the port 84 whereby the oil previously delivered to the push rod is trapped therein and incoming oil escapes from the bearing shoe of the lifter to lubricate the cam and return to the sump.

Experiments have shown that the interia valve is unnecessary. As best shown in FIG. 4, the gallery 76 can be located to register with the ducts 78 only when the actuator shoe 42 is in its extreme elevated position, the cam nose 36 of the valve cam 32 being at top dead center. Thus, the oil arriving into the gallery 76 from the pump through the line 74 is forced in an upward direction through the port 86 into the bore 88 of push rod 30. At all other times, the oil surplus can escape through the port 84 which is partially blocked by the cam. Either the cam offers less obstruction at this time or, as seems more likely, there is sufficient oil supplied through the duct 74 so that only a part of it can escape through the duct 84 at any time, the rest of it being constrained to flow upwardly through the push rod 30 to lubricate the rocker arm and other elevated bearing parts. In any event, the oil under pump pressure is delivered into the cavity 80 of the lifter shoe 42 only in the extreme top position of the lifter as shown in FIG. 4. At all other times, the admission duct 78 is out of registry with the gallery 76.

Since the push rod 30 is in substantial axial alignment with the lifter or actuator 40 at all times, the lateral pressure on the lifter is nominal and the constant and adequate lubrication of the bearing between the lifter and the bore 46 makes it unnecessary for the sleeve portion 50 of the lifter to be made of highly wear resistant material. On the contrary, extremely lightweight and readily deformable tubing of aluminum or the like can be employed, this being advantageous in permitting the deformation of the sleeve to maintain the integral assembly of the sleeve and the bearing shoe and the disk without extraneous connecting means. The assembly weights only half, or less than half, as much as any lifter previously employed in commercial engines of comparable type and valve lifting requirements.

This, in turn, permits the bias of the valve spring 14 to be greatly reduced, with resultant advantages in reducing the thrust and wear between the shoe 42 and the cam 32. Yet the spring 14, even at its reduced bias, is entirely adequate to overcome the inertia of the shoe in a valve closing direction and thus to cause the shoe to follow accurately the controlling surface of the cam 32. This greatly enhances the accuracy with which the cam controls both the opening and the closing movement of valve 10.

We claim:
1. A valve actuator which includes a cam follower shoe, guide sleeve, and push rod thrust member, said actuator comprising, in integral combination, a shoe having the form of a shallow cup with a bottom cam follower surface, an annular shoulder above said surface, and an annular side wall with a channel intermediate its ends and having an upper rim and an internal chamber, a thrust disk having a central push rod bearing and peripherally seated directly on the upper rim of the side wall, and said guide sleeve having a lower end portion engaging the shoulder, said sleeve embracing the side wall and extending above the disk, said sleeve having an integral rib engaged in the channel of the side wall of the shoe and interlocking the sleeve with the shoe and further having an inwardly deformed portion overlying the disk and holding the disk to the side wall.

2. An actuator according to claim 1 in which the cup shaped shoe and said sleeve have registering duct means, the shoe and disk being provided with oppositely opening oil ports generally disposed centrally of the actuator.

3. An actuator according to claim 2 in further combination with bearing means within which the sleeve is reciprocable between advanced and retracted positions and which is provided with a gallery with which said duct means communicates during reciprocation of the actuator and in further combination with means for supplying lubricant under pressure to said gallery.

4. An actuator according to claim 3 in further combination with a push rod having a central bore communicating with the port with which said disk is provided, the disk and push rod having complementary concave and convex bearing surfaces about said port and bore.

5. An actuator according to claim 4 in which an inertia valve within the cup shaped follower shoe has terminal portions respectively seated alternately in the ports of the shoe and disk in the course of the reciprocation of the actuator.

6. An actuator according to claim 4 in which the duct means of the shoe and sleeve register with the gallery only in an upper position of the actuator, and in further combination with a cam rotatably engaged with the follower to control the movement of the follower, the cam having a nose substantially registering with the port of said shoe in the advanced actuator position in which the duct means registers with said gallery.

7. A valve operating train comprising the combination with a valve movable to and from a seat and having a stem and a valve seating spring, of means for controlling valve opening and closing movement and comprising a cam shaft and cam, a valve lifter, a push rod, and a rocker arm engaged by the push rod and stem, the lifter comprising a cup shaped follower having a shoe portion engaged with the cam and a tubular wall portion extending upwardly from the shoe portion and provided with a shoulder encircling the wall portion, a lightweight bearing sleeve seated on the shoulder and embracing the wall portion, the wall portion having an external channel and the sleeve having an internal rib engaged with the channel, a push rod bearing disk seated on the upper end of the wall portion, the sleeve having an internally deformed portion seated on said disk and holding the disk integrally assembled upon the upper end of the wall portion of the shoe, said disk having a socket in which the lower extremity of the push rod is operatively engaged.

8. A valve operating train according to claim 7 in which the sleeve and the wall portion of said shoe are provided with registering duct means for admitting lubricant to the interior of the cup shaped shoe and in further combination with bearing means in which the sleeve is reciprocable and which has means for supplying lubricant under pressure for passage through said duct means to the interior of said shoe, the bearing disk and push rod and rocker arm having duct means for transmitting to said rocker arm oil under pressure received from the oil supply means, and the rocker arm having bearing surfaces to which the duct means lead for the lubrication of such surfaces.

References Cited by the Examiner

UNITED STATES PATENTS

| Re. 25,974 | 3/1966 | Dadd | 123—90 |
| 2,381,339 | 8/1945 | Doman | 123—196 X |
| 2,797,673 | 7/1957 | Black | 123—90 |
| 3,054,392 | 9/1962 | Thompson | 123—90 |

FOREIGN PATENTS 924,545  3/1955  Germany.

LAVERNE D. GEIGER, *Primary Examiner.*

H. S. BELL, *Assistant Examiner.*